Dec. 16, 1947.  E. R. ROBERTSON  2,432,805
LOCK NUT
Filed Jan. 10, 1945
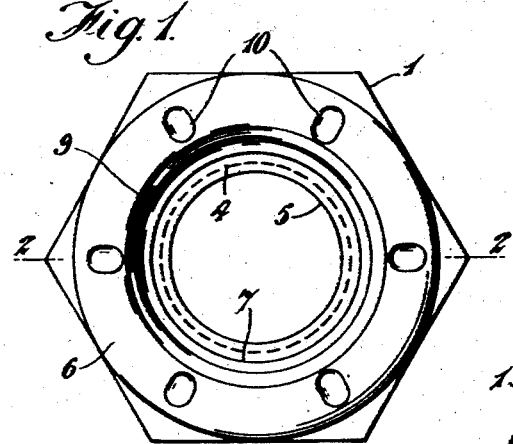
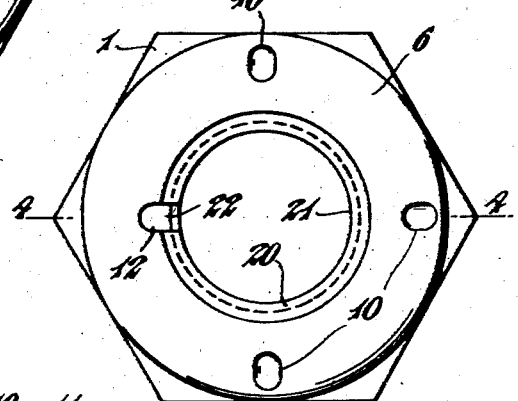
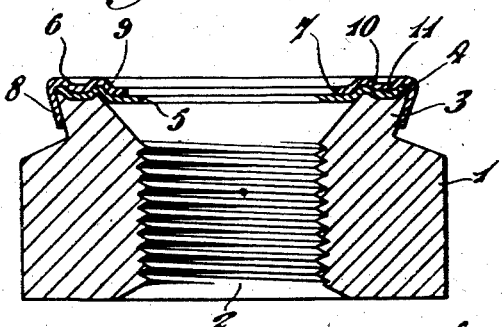
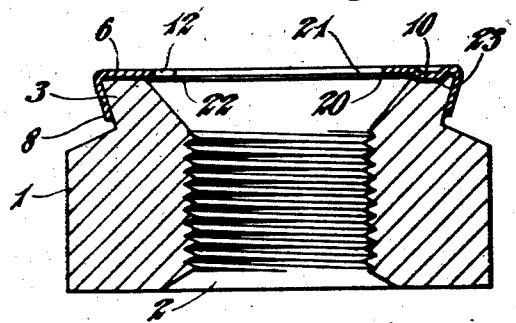

Patented Dec. 16, 1947

2,432,805

UNITED STATES PATENT OFFICE 2,432,805

LOCK NUT

Edward Roker Robertson, St. Margarets-on-Thames, Twickenham, England, assignor to Oliver Edwin Simmonds, Ripley, Surrey, England Application January 10, 1945, Serial No. 572,188
In Great Britain February 14, 1944

4 Claims. (Cl. 151—21)

This invention relates to self-locking nuts and like internally screw-threaded members (hereinafter referred to as a nut) of the kind comprising a body portion having a screw-threaded bore, and a locking member secured to the non-working end thereof against relative rotary and axial bodily movement, the locking member having a bolt-thread engaging portion which, before the nut is screwed on to a co-operating bolt, is out of helical alignment with the thread of the body portion of the nut and which is brought into helical alignment with such thread on screwing the nut on to the bolt, the resulting displacement of the bolt-thread engaging portion of the locking member causing the locking member to flex with the result that it is caused to exert on the bolt an axial force which urges adjacent sides of the threads of the nut and bolt together.

Various forms of self-locking nuts of the kind specified have heretofore been proposed wherein the locking member is formed separately from the body portion of the nut and is made of spring steel, phosphor bronze or other hard resilient material.

It has been found that, in some cases, particularly where the co-operating bolt is made of a non-ferrous material which is considerably softer than the metal of which the locking member is made, there is a danger that the locking member may cause wear to or otherwise damage the thread of the bolt, and the present invention has for its principal object to provide a self-locking nut of the kind specified in which this danger can be obviated.

In accordance with the present invention I provide a self-locking nut of the kind specified with an additional member that is resilient and that co-operates with the locking member to resist flexure thereof, the additional resilient member being adapted to clear the bolt thread when the nut and bolt are screwed together. In this manner, the locking member may be made of any desired material having little or no resiliency, the required resiliency being provided by the additional resilient member. For example, the locking member may be made of the same material as the body portion of the nut, the resilient member being made of spring steel or other desired resilient material.

It is preferred that both the locking member and the additional resilient member be made separately from the body portion of the nut and in the form of apertured discs, the resilient member being arranged externally of and seating on the locking member so as to support the locking member over substantially its whole area. It is preferred, moreover, that the locking member be seated on the non-working end of the body portion of the nut so that its point of flexure extends externally of the said portion of the nut, and that the locking and resilient members be secured to the said body portion by means depending from the periphery of the resilient member.

It is not necessary that the locking member should be of such form that its point of flexure is a circle and the outer periphery of the locking member may be of a form other than circular.

The invention will be further described with reference to the accompanying drawing, in which Fig. 1 is a top plan view of one form of self-locking nut in accordance with the invention;

Fig. 2 is a vertical sectional view taken on the line 2—2 of Fig. 1;

Fig. 3 is a top plan view of another form of nut in accordance with the invention, and Fig. 4 is a vertical sectional view taken on the line 4—4 of Fig. 3.

The nut shown in Figs. 1 and 2 comprises a body portion 1 which has a screw-threaded bore 2 and at its non-working end a neck or tubular extension 3. The body portion 1 is shown as having the usual hexagonal configuration but it may be of any other desired contour. Seated on the end of neck 3 is the locking member 4 which is in the form of a centrally holed disc that is of uniform thickness and that is internally threaded at 5 to the same pitch and size as the threads of bore 2. It is preferred that the locking member 4 be relatively thin and it may have a thickness substantially equal to or substantially less than the pitch of the threads of bore 2.

The resilient member is shown as being in the form of an annular disc 6 that is held seated on the locking member 4 so as to support the locking member over substantially its whole area. The hole 7 in the resilient member 6 has a diameter slightly greater than the maximum diameter of the threads of bore 2 so that such member 6 clears the threads of a co-operating bolt when the nut is screwed thereon. The composite locking means is secured to the body portion of the nut against axial bodily movement by means depending from the outer periphery of the resilient member 6, and in the nut illustrated such means is in the form of a conical flange 8 which is secured to the neck 3 by upsetting the neck into interlocking engagement with the flange, by crimping the flange on to the neck, or in any other desired manner.

In the manufacture of this form of nut, the locking and resilient members in the form of flat discs are secured to the body portion of the nut in the manner above described, the body portion of the nut and the locking member are provided with helically aligned threads, as by passing a tap through the assembly, and the thread of the locking member is then brought out of pitch with the thread of the body portion, for example, by dishing the central portions of the locking and resilient members as shown at 9. It is preferred to provide the resilient member with stiffening ribs and such ribs are advantageously provided on the locking member also, the ribs formed on the locking member preferably being indented into the body portion of the nut whereby it and the locking member are keyed together against relative rotary movement.

In the nut shown in the drawing, stiffening ribs 10, 11 are simultaneously formed on the resilient and locking members respectively prior to the threading operation, the ribs 11 being indented into the end of neck 3.

It will be understood that, when the nut is screwed on to a bolt, the thread of the locking member 4, being out of pitch with the thread of the body portion 1, is displaced axially to bring the threads of the two parts into phase. This axial displacement of the thread of the locking member causes both the locking member and the resilient member 6 to flex about a fulcrum circle of relatively large radius. Member 6, being resilient, and bearing on the locking member between the fulcrum circle formed at the inner edge of the outer end of the neck 3 and the threaded edge 5 which enters between the threads of the nut, tends to urge the locking member back to its out-of-pitch position with the result that the locking member is caused to exert on the bolt a strong axial force which urges the load-carrying sides of the threads of the nut and bolt together, thus preventing unintentional slackening of the nut.

The bolt-engaging portion of the locking member may take forms other than a thread.

In the nut shown in Figs. 3 and 4 the body portion of the nut and the resilient member are generally similar to those shown in Figs. 1 and 2 and like reference numerals are used to denote like parts. The locking member 20 is unthreaded and comprises a flat centrally-holed disc of uniform thickness. The diameter of hole 21 in disc 20 is less than the maximum diameter of the threads of bore 2 and the disc has a single slot 22 extending radially outward from the edge of hole 21. The locking member 20 extends in a plane normal to the nut axis and it is supported over substantially the whole of its area by the resilient member 6 which in this case has a radial slot 12 aligned with slot 22 whereby the resilient member can be displaced and twisted in exactly the same way as the locking member. It will be understood that, when this form of nut is screwed on to a bolt, the part of the locking member adjacent hole 21 enters between the bolt threads and is axially displaced and twisted helically into helical alignment with the threads of bore 2. This results in a corresponding displacement and twisting of the resilient member 6 which thus causes the locking member to exert on the bolt an axial force which urges the load-carrying sides of the threads of the nut and bolt together. In the nut illustrated, the resilient member 6 and the locking member 20 are provided with three stiffening ribs 19, 23 respectively, the ribs on the locking member being indented into the end of neck 3, as in the nut shown in Figs. 1 and 2. The shape of the resilient member 6 may, if desired, be such that the resilient member gives different loadings on different circumferential parts of the locking member 20, and the loading may vary inversely to the axial displacement given to the various parts of the bolt-engaging portion of the locking member.

Although, in most cases, it is preferred that the locking member be secured to the body portion of the nut so that its point of flexure occurs externally of the body portion of the nut, as in the two forms of nut illustrated, the composite locking means may be secured to the body portion of the nut in other ways than that shown such that the locking member cannot move bodily in an axial direction and that the resilient member cooperates with the locking member to impart resiliency thereto.

The body portion of the improved nut may be formed from bar stock of hexagonal or other desired configuration or from sheet metal stock. The locking means may, moreover, comprise a plurality of locking members or a plurality of cooperating resilient members, or both. If desired, the locking member may be formed of resilient material in which case the additional resilient member provides a locking means of enhanced resiliency.

I claim:

1. A lock nut comprising a body portion having a screw-threaded bore, a locking member secured to the body portion against relative axial bodily movement and having a portion which is out of helical alignment with the thread of the bore of said body portion and which is adapted to, and is so positioned as to enter between the threads of a cooperating bolt onto which the nut may be threaded, said body portion having a fulcrum edge between its outer periphery and the threaded bore, a part of said locking member which is radially outward from the portion thereof which enters between the threads of a cooperating bolt bearing on said fulcrum edge, and a resilient member secured to the body portion and exerting a force on said locking member between said fulcrum edge and the portion of said locking member which enters between the thread of a cooperating bolt to resist flexure of said locking member about said fulcrum edge, the respective parts being so constructed and arranged that when the nut is screwed onto a cooperating bolt the portion of the locking member which enters between the threads of the bolt is brought into helical alignment with the threads of the bolt and the body portion of the nut and the locking member thereby flexed, against pressure exerted thereon by said resilient member.

2. A lock nut as set forth in claim 1 in which the fulcrum edge is of arcuate shape and substantially concentric with the threaded bore of the body portion.

3. A lock nut as set forth in claim 1 in which the fulcrum edge is circular and substantially concentric with the threaded bore of the body portion and in which the locking member is an apertured disc.

4. A lock nut as set forth in claim 1 in which the locking member also is secured to the body portion against relative rotary movement.

EDWARD ROKER ROBERTSON.

(References on following page)

REFERENCES CITED

The following references are of record in the file of this patent:

UNITED STATES PATENTS

| Number | Name | Date |
|---|---|---|
| 1,550,282 | Rennerfelt | Aug. 18, 1925 |
| 1,791,017 | Sundh | Feb. 3, 1931 |
| 1,729,013 | Rennerfelt | Sept. 24, 1929 |
| 2,222,460 | Crowley | Nov. 19, 1940 |
| 2,391,989 | Luce | Jan. 1, 1946 |

FOREIGN PATENTS

| Number | Country | Date |
|---|---|---|
| 538,497 | Great Britain | Aug. 6, 1941 |
| 545,828 | Great Britain | June 15, 1942 |
| 558,414 | Great Britain | Jan. 4, 1944 |